(12) United States Patent
Ganasan et al.

(10) Patent No.: US 8,861,410 B2
(45) Date of Patent: Oct. 14, 2014

(54) METHOD AND APPARATUS FOR SCALABLE NETWORK TRANSACTION IDENTIFIER FOR INTERCONNECTS

(75) Inventors: Jaya Prakash Subramaniam Ganasan, Youngsville, NC (US); Prudhvi N. Nooney, Raleigh, NC (US); Darren P. Umstead, Raleigh, NC (US); Joseph L. Van Swearingen, Raleigh, NC (US); Barry Joe Wolford, Cary, NC (US); Mark Michael Schaffer, Raleigh, NC (US)

(73) Assignee: QUALCOMM Incorporated, San Diego, CA (US)

( * ) Notice: Subject to any disclaimer, the term of this patent is extended or adjusted under 35 U.S.C. 154(b) by 284 days.

(21) Appl. No.: 13/285,215

(22) Filed: Oct. 31, 2011

(65) Prior Publication Data

US 2013/0107880 A1    May 2, 2013

(51) Int. Cl.
*H04B 7/00*    (2006.01)
(52) U.S. Cl.
USPC ........................................................ 370/310
(58) Field of Classification Search
USPC ................................................ 370/310–350
See application file for complete search history.

(56) References Cited

U.S. PATENT DOCUMENTS

| | | | |
|---|---|---|---|
| 7,051,150 B2 | 5/2006 | Naumann et al. | |
| 7,124,230 B2 | 10/2006 | Smith et al. | |
| 7,404,008 B2 * | 7/2008 | Takeuchi et al. | 709/245 |
| 7,558,895 B2 | 7/2009 | Bruce | |
| 7,769,893 B2 | 8/2010 | Goossens | |
| 2003/0167340 A1 | 9/2003 | Jonsson et al. | |
| 2004/0246933 A1 * | 12/2004 | Valko et al. | 370/338 |
| 2008/0313365 A1 | 12/2008 | Bruce | |
| 2012/0320876 A1 * | 12/2012 | Zhou et al. | 370/331 |

FOREIGN PATENT DOCUMENTS

EP    1185069 A2    3/2002

OTHER PUBLICATIONS

International Search Report and Written Opinion—PCT/US2012/062864—ISA/EPO—Apr. 8, 2013.

* cited by examiner

*Primary Examiner* — Fan Ng
(74) *Attorney, Agent, or Firm* — Peter Michael Kamarchik; Nicholas J. Pauley; Joseph Agusta

(57) ABSTRACT

A transaction request passes from an initiator through interconnect paths and a routing ID indicating the interconnect paths is prepended. A temporary ID is assigned to the routing ID, the transaction request with the temporary ID is sent to a target device, and a response having the temporary ID is received. The routing ID is retrieved using the target ID, and the response with the retrieved routing ID is sent to the initiator.

42 Claims, 4 Drawing Sheets

METHOD AND APPARATUS FOR SCALABLE NETWORK TRANSACTION IDENTIFIER FOR INTERCONNECTS

FIELD OF DISCLOSURE

The present disclosure relates to networks and, more particularly, to routing of data through networks.

BACKGROUND

Communication between devices connected through a network may begin with the generation of a transaction request by a device that, by external assignment or internal programming, is an "initiator." An initiator may be a programmable processor, or an individual thread on a processor. A target device may be a data memory, for example a direct memory access (DMA) random access memory (RAM). The transaction request includes the identifier (ID) of the target device, or "target ID," and a command specifying the particular kind of transaction that is requested, for example a data read or data write. The network routes the transaction request to the target device using the target ID. The target device then performs the requested transaction.

For certain transactions, such as a data read, the target device generates a response, e.g., data read from the target device, and the network must be capable of routing this response back to the initiator. One means for routing the response back to the initiator is to assign each initiator a unique initiator ID, include this initiator ID in each transaction request, have the target device likewise include the initiator ID in its response, and configure the network to route the response back to the initiator using its ID. However, this requires that each initiator ID be unique, and since initiators such as threads are temporary, it necessitates a system-wide authority for dynamically assigning and retiring IDs, and maintaining tracking or routing information throughout network.

Another means for routing target device responses to transaction requests back to the initiator is by incrementally appending to the transaction request, as it passes from the initiator through successive network ports or other interfaces and/or through path segments in the network to reach the target device a path ID for each of the path segments. The appending may be to the front of, i.e., "prepended" to, the transaction request. When the transaction request reaches its target it has prepended to it the path ID of every port or interface and/or path segment through which it passed. The target device then appends, or prepends this same succession of path IDs to its response to the transaction request. The network then routes the response through the same path segments, in reverse order, using the prepended sequence of path IDs.

The prepending scheme, although not requiring a system-wide authority for dynamically assigning unique IDs for initiators, or maintaining and updating routing tables throughout the network, may also have significant costs. In particular, as the number of levels of the network increases the number of successive path segment IDs that must be prepended to the transaction requests increases. Also, as has been long known to persons of ordinary skill in the art, prepending schemes may require monitoring at each succeeding network level an activity status regarding particular sequences of path IDs. One result is that the total number of bits required for the network to implement the scheme increases in substantially exponential manner.

SUMMARY

Exemplary embodiments of the invention are directed to systems and methods providing scalable routing of responses to transaction requests, without the increase in routing overhead as the number of interconnect levels increases, which is inherent in certain known routing methods.

One exemplary embodiment provides a method for managing a network, and one example according to the embodiment can include receiving a message having a routing identifier, and assigning the message, based on the routing identifier, a temporary identifier. One method according to the one exemplary embodiment further includes storing a record associating the routing identifier with the temporary identifier, and communicating the message with the temporary identifier. The one method according to the one embodiment can further include receiving a response message having the temporary identifier, and communicating the response message according to the associated routing identifier.

In one aspect, in one example method according to the one exemplary embodiment, storing a record can include storing the routing identifier to be retrievable based on the temporary identifier.

In another aspect, one example method according to the one exemplary embodiment can further include detecting whether a temporary identifier has already been assigned to the routing identifier and, if a temporary identifier has not already been assigned, identifying a non-assigned temporary identifier and assigning the non-assigned temporary identifier to the routing identifier.

In one related aspect, one example method according to the one exemplary embodiment can further include, upon detecting that a temporary identifier has already been assigned, communicating the message with the already assigned temporary identifier.

In another aspect, in one example method according to the one exemplary embodiment, communicating the message with the temporary identifier can include stripping the routing identifier from the message and prepending the temporary identifier to the message.

In another aspect, in one example method according to the one exemplary embodiment, communicating the message with the temporary identifier can include prepending the temporary identifier to the message with the routing identifier.

One exemplary embodiment provides a network communication apparatus, and one example according to the exemplary embodiment can include an interface with an upstream network and a downstream network, and a processor coupled to the interface and configured to receive a message from the upstream network having a routing identifier, to assign a temporary identifier to the routing identifier, to store a record associating the routing identifier with the temporary identifier, to communicate the message with the temporary identifier to the downstream network, to receive from the downstream network a response message having the temporary identifier; to identify the routing identifier associated with the temporary identifier based on the record, and to communicate the response message to the upstream network with the identified routing identifier.

Another exemplary embodiments provides a computer-readable medium comprising instructions, which when executed by a processor in a network operate to assign temporary identifiers to messages, and the computer-readable media can include instructions for receiving a message having a routing identifier, instructions for assigning the message, based on the routing identifier, a temporary identifier, instructions for storing a record associating the routing identifier with the temporary identifier, instructions for communicating the message with the temporary identifier, instructions for receiving a response message having the temporary identifier, and instructions for communicating the response message according to the associated routing identifier.

One exemplary embodiment provides an apparatus for communicating messages with a downstream network, and one example according to the exemplary embodiment can include means for receiving a message having a routing identifier, means for assigning the message, based on the routing identifier, a temporary identifier, means for storing a record associating the routing identifier with the temporary identifier, means for communicating the message with the temporary identifier to the downstream network, means for receiving from the downstream network a response message having the temporary identifier, and means for communicating the response message to a source associated with the routing identifier.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Figure 1:
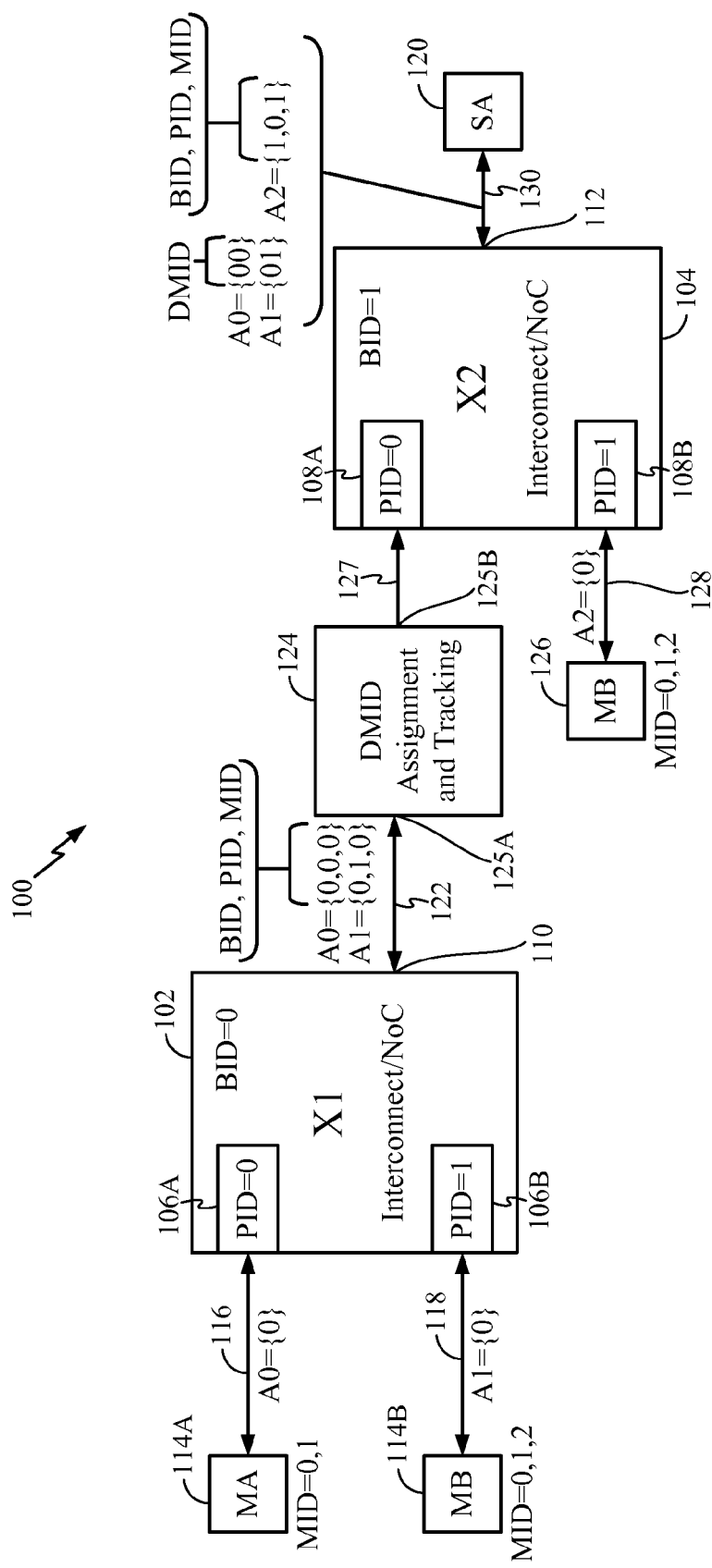
FIG. 1 shows a functional block schematic of one example scalable network transaction interconnect system according to one exemplary embodiment.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions and sequences of actions described herein can be performed by specific circuits (e.g., application specific integrated circuits (ASICs)), by program instructions being executed by one or more processors, or by a combination of both. Additionally, these actions and sequences of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

It will be understood that except where explicitly stated otherwise or where made clear from the context the terms "interconnect" and "network" are intended as interchangeable without changing the meaning of the recitation in which they appear.

In describing features, illustrative devices to generate commands for communication may be referred to as "initiators," and devices to which the commands are communicated for execution and generating a response may be referred to as "target devices." It will be understood, though, that these terms "initiators" and "target device" are used herein only for identifying which device(s) that, in the context of the example systems, may perform the specific functions or acts of the example operation being described—without limitation to a particular category or kind device, and without limiting the scope of any of the exemplary embodiments or any aspect thereof. For illustration, an initiator may be a programmable processor, or specific thread hosted on, for example, a programmable processor. A programmable processor may, on the other hand, be a target device. Other illustrations of devices that may operate as target devices include, but are not limited to, random access memory RAM, direct memory access (DMA) and other memory.

To further assist persons of ordinary skill in the art in understanding concepts sufficiently to practice the exemplary embodiments, some example actions and operations showing such concepts are described in reference to "master-slave" systems having "master devices" and "slave devices." The exemplary embodiments, though, are not limited to "master-slave" networks. On the contrary, persons of ordinary skill in the art can, from the present disclosure, readily adapt the concepts described in reference to master-slave system to other network architectures.

As used herein, the term "downstream" means the direction transaction requests flow from initiators to target devices, where "flow" means progression through a state machine representation of the communication path taken by the transaction request, which may be independent of spatial direction. The phrase upstream direction," as used herein, means the opposite of "downstream" direction.

Examples of systems having exemplary embodiments are described referencing interconnected sub-networks, each having "initiator" I/O ports" and "target" I/O ports." It will be understood that "initiator" I/O port and "target" I/O port are only labels of I/O port or other interface function and, standing alone, are not any limitation to any particular structure. For example, exemplary embodiments may be implemented with interconnected sub-networks having interface resources that include I/O ports that may perform as initiator I/O ports or as target I/O ports.

One example system according to one embodiment may have a first sub-network and a second sub-network, each of the sub-networks having initiator ports and at least one target port. In one example the first sub-network may be upstream of the second sub-network. Each of the first sub-network's initiator ports and each of the second sub-network's initiator ports may have, or be assigned a port identifier, arbitrarily labeled herein as "PID." The first and second sub-networks may have respective identifiers, arbitrarily labeled herein as "BID."

In an example process according to one embodiment, initiators may include an identifier of the initiator, arbitrarily labeled herein as "MID," with transaction requests and other messages that sent downstream. In one example, the MID of an initiator may have a set of possible values, for example if the initiator is a proxy for multiple other initiators.

In an example system or method according to one embodiment the sub-networks may have means for prepending or otherwise including with transaction requests, and other messages received at an initiator port, the PID of the initiator port at which the transaction request or other message was received, and may have means for prepending the BID of the sub-network, and for outputting the transaction request or other message from a target I/O with these BID, PID, MID values prepended. The prepended BID, PID, MID of the transaction request or other message will be alternatively referenced in this description as the "routing identifier" or "routing ID" of that transaction request. It will be understood that the routing ID may uniquely define, at the target port that it is output from, an upstream route to the initiator of the transaction request or other message at the initiator port of the sub-network. Transaction requests having a routing ID will be alternatively referenced as "routing ID prepended transactions requests."

According to one exemplary embodiment, communicating a routing ID prepended transaction request from a target port of a first sub-network to a downstream target device at a target port of a second sub-network, for example downstream of the first sub-network, is through a temporary unique identifier and tracking block that prepends (or otherwise includes) a temporary unique identifier or ID, and the target device uses this temporary unique ID to send its upstream response to the transaction request. In one aspect the temporary unique identifier and tracking block strips off the routing ID when, or in association with, prepending the temporary unique identifier. In another aspect, the temporary unique identifier and tracking block can optionally leave the routing ID on the message prepended with the temporary unique identifier, for optional uses such as sorting response messages from various target devices. Further to the one exemplary embodiment, the temporary unique identifier and tracking block may, upon receiving from a target device a response message having the temporary unique ID, retrieve the routing ID, strip off the temporary unique ID, prepend the retrieved routing ID and send the response upstream to the initiator of the transaction request or other message.

In one aspect the temporary unique identifiers, or "dynamically allocated unique identifiers" ("DMIDs") are each temporarily assigned to a specific routing ID. In one example according to one aspect, a temporary unique ID assignment and tracking block, or "DMID assignment and tracking" block, may be configured to make N different DMIDs available upon an initialization, and thereafter to assign or allocate the DMIDs on, for example, a first-come-first-served basis. In a further aspect, the DMID assignment and tracking block may be configured to maintain a DMID assignment record, indicating for each DMID whether it has been assigned to any routing ID and, if so, the identity of that routing ID (e.g., to which specific {BID, PID, MID}).

In one aspect, the DMID assignment and tracking block may be configured to check to determine if an assignment of a DMID to a routing ID prepended transaction request is necessary by searching the DMID assignment record, using the routing ID, to determine whether that routing ID (e.g., the MID, PID and BID) is currently assigned to any of the N DMIDs. In another example aspect, the DMID assignment and tracking block may be configured to select, in response to detecting that the routing ID of a routing ID prepended transaction request does not have a currently assigned DMID, one of the remaining DMIDs and allocate or assign that DMID to that routing ID. In a still further aspect, the DMID assignment and tracking block may be configured to retrieve, in response to a match of the routing ID of a routing ID prepended transaction request to a routing ID already in the DMID assignment record as having an assigned DMID, the value of the DMID.

In one aspect, the DMID assignment and tracking block may be configured to transform or translate the routing ID prepended transaction request into a DMID prepended transaction request by, for example, prepending the newly assigned or retrieved DMID in place of the routing ID. The DMID assignment and tracking block may then communicate the DMID prepended transaction request downstream, for example to an initiator port of the second sub-network, or another downstream sub-network having a target I/O port interfacing the target device to which the originally generated transaction request was directed.

In one example system or method according to one exemplary embodiment, when the target device receives the DMID prepended transaction request, the target device processes or tracks the DMID as if it were a conventional routing ID (e.g., {BID, PID, MID}) of a transaction request. In other words, the target device uses the DMID to track the initiator to which the target device will send responses to the transaction request. The target device may, accordingly, send its response upstream in a conventional manner, except prepending to (or otherwise including with) the response message the DMID instead of the conventional routing ID, forming what will be generically referenced as "DMID prepended response message."

In one example system of one example method according to one or more exemplary embodiments, the DMID assignment and tracking block may be configured to receive the DMID prepended response message upstream of the target device and utilize the association between currently assigned DMIDs and the routing IDs to which each is assigned to retrieve the routing ID and then send the response to an upstream interconnect for conventional routing back to the initiator.

In another aspect, the DMID assignment and tracking block may be configured to determine when allocated DMIDs are no longer being used and, upon such determination, to release the DMID to be available for re-assignment or re-allocation.

FIG. 1 shows a function block schematic of one example scalable network transaction tracking (alternatively referenced hereinafter as "scalable NTT") system 100 according to one exemplary embodiment. In describing aspects and features in reference to the scalable NTT system 100, devices interfacing the system will be referenced as "master" and "slave," and ports referred to as a "master port" or "slave port." It will be understood this referencing is not intended to limit the scope of any of the exemplary embodiments, including scalable NTT systems embodying concepts exemplified by the FIG. 1 scalable NTT system 100 to "master-slave" network architectures.

Referring to FIG. 1, the example scalable NTT system 100 may comprise a first or "X1" interconnect 102 and a second or "X2" interconnect 104 downstream from the X1 interconnect 102. The X1 interconnect 102 may have, as interface resources, a plurality of master ports, for example an X1 first master port 106A and an X1 second master port 106B, and may have at least one slave port, for example the X1 slave port 110. The X2 interconnect 104 may, similarly, have an X2 first master port 108A and an X2 second master port 108B and at least one slave port, for example the X2 slave port 112.

It is assumed that the example X1 interconnect 102 and X2 interconnect 104 each have switching or routing logic (not shown) for forwarding or routing messages received at any of their master ports to their at least one slave port. The X1 interconnect 102, for example, is assumed to have switching logic (not shown) for communicating transaction requests or other messages received at either the X1 first master port 106A or X1 second master port 106B to its X1 slave port 110. The X1 interconnect 102 also includes switching or routing logic (not shown) for routing messages, for example transaction responses, received at its slave port 110 to the appropriate one of its X1 first master port 106A or second master port 106B, depending on a routing ID that will be prepended to the transaction responses, as described in greater detail at later sections. The X2 interconnect 104 may have similar switching or routing logic for communicating messages from its X2 slave port 112 upstream to its X2 first and second master ports 108A, 108B. In one example, except for minor modifications that will be readily apparent to persons of ordinary skill in the art from this disclosure, the X1 interconnect 102 and X2 interconnect 104 may each be according to conventional master-slave interconnects. Further detailed description of internal structure of the X1 interconnect 102 and X2 interconnect 104 is therefore omitted.

Continuing to refer to FIG. 1, the example X1 interconnect 102 stores, or is otherwise configured with a port identifier for each of its master ports, for example an X1 first port PID for the X1 first master port 106A and an X1 second port PID for the X1 second master port 106B. In the FIG. 1 example scalable NTT system 100, the X1 first port PID is "0" and the X1 second port PID is "1." It will be understood that except for being different from one another, these values are arbitrary, both with respect to value and their number of bits (which in this example is one.) Likewise, the X2 first port PID is "0" and the X2 second port PID is "1." The X1 interconnect 102 may store or be otherwise configured with an X1 interconnect BID of, for example "0," and the X2 interconnect 104 may store or be otherwise configured with an X2 interconnect BID of, for example "1." It will be understood that except for being different from one another, the X1 interconnect BID and the X2 interconnect BID values are arbitrary, both with respect to value and their number of bits. As to structures for maintaining the X1 first port PID, X1 second port PID, X1 interconnect BID, X2 first port PID, X2 second port PID, and X2 interconnect BID, persons of ordinary skill in the art can readily select and implement various structures to store these values in a manner compatible with their described functions. Further detailed description of such structure is therefore omitted.

The FIG. 1 scalable NTT system 100 is shown in an example environment having a first master device 114A that interfaces with the X1 first master port 106A and a second master device 114B that interfaces with the X1 second master port 106B. The first master device 114A is assumed, for purposes of arbitrary example, to be a proxy for two master devices (not shown). It will therefore be assumed for this example that the first master device 114A sends transfer requests and other messages with an identifier, hereinafter referenced as a "first master device MID," having one of two values, for example "0" and "1." It will be understood that the example values of "0" and "1" are arbitrary; any two different values may be used for this example first master device MID. The second master device 114B is assumed, also for purposes of example, to be a proxy for three master devices (not shown). The second master device 114B is therefore assumed to send transfer requests and other messages with an identifier, hereinafter referenced as a "second master device MID," having one of three values, for example "0," "1" and "2."

Example transaction requests are shown on each of coupling logic 116 and 118, from the first and second master devices 114A and 114B, respectively, each having a form "Ax={y}," and it will be understood that "x" represents a specific transaction request, and "y" is the master device identifier associated with the transaction request. It will be understood that "coupling logic 116 and 118" do not necessarily represent physical structure and, instead, are graphical reference point of where a data may be available. The specific example, "A0={0}" on the coupling logic 116, represents a transaction request "A0" from the first master device 114A, with a first master device MID of "0" (from among the possible values of "0" and "1"). Likewise, "A1={0}" on the coupling logic 118 is an example transaction request "A1" from the second master device 114B, with a second master device MID of "0" (from among the possible values of "0," "1," and "2"). The example assumes "A0" and "A1" each specify a transaction, for example a read or a write, and that each has a target device ID corresponding to the example target device 120, and is described in greater detail at later sections. It will also be assumed that the transaction(s) specified by "A0" and "A1" require a response be sent by the target device 120, as also later described in greater detail.

The X1 interconnect 102 is assumed to include logic (not explicitly shown in the figures) for prepending to, appending to, or otherwise including with the transaction request "A0={0}" it receives at the X1 first master port 106A, the X1 first port PID, as well as the X1 interconnect BID, and for outputting the result on the X1 slave port 110. Similarly, the X1 interconnect 102 is assumed to include logic (not explicitly shown in the figures) for prepending to, appending to, or otherwise including with the transaction request "A1={0}" it receives at the X1 second master port 106B, the X1 second port PID, also with the X1 interconnect BID, and also for outputting the result on the X1 slave port 110. Persons of ordinary skill in the art, applying the knowledge of packet switching networks such persons possess to the present disclosure, can readily select and arrange structure to perform these prepending functions for practicing according to exemplary embodiments. Further detailed description of such structure is therefore omitted.

It will be understood that the prepending results at the X1 slave port 110 may be generically represented as "Ax={BID, PID, MID}," with "MID" being the either the first master device MID or the second master device MID, "PID" being either the X1 first port PID or the X1 second port PID, and BID being the X1 interconnect BID. Therefore, "A1={0,1, 0}" on the coupling 122 to the X1 slave port 110 represents the transaction request "A1" that may be prepended, in right to left order, with the second master device MID example of "0," the X1 second port PID of "1," and X1 interconnect BID of "0." It will be noted that the {BID, PID, MID} information that may be prepended to the transaction requests "A0" and "A1" is sufficient, looking upstream from at the X1 slave port 110, to send a response to the master device associated with "A0" or "A1." As previously described, the "{BID, PID, MID}" information is referenced alternatively as the "routing identifier," or "routing ID." Further, transaction requests at the X1 slave port 110 prepended with the routing ID are hereinafter alternatively referenced as "routing ID prepended transaction requests." It will therefore be understood that "A0={0, 0,0}" and "A1={0,1,0}" are two examples of "routing ID prepended transaction requests."

It will be understood that the exemplary embodiments are not limited to practices that prepend the routing IDs, and that embodiments may be practiced with the routing ID appended, prepended, or embedded within its corresponding transaction request packet. It will therefore be understood that "prepended" is defined to mean "prepended, appended, or embedded," except where explicitly stated otherwise or made clear from the context to have a different meaning.

With continuing reference to FIG. 1, the example scalable NTT system 100 may include a transaction request temporary ID assignment and tracking block (hereinafter referenced as the DMID assignment and tracking block 124) which will be described in greater detail at later sections. The DMID assignment and tracking block 124, as will be further described, may be configured to allocate or assign a DMID to the routing ID prepended transaction requests it receives, for example at logic port 125A, from upstream master devices, prepend the DMID to the transaction request in place of the routing ID, and send the DMID-prepended transaction request, for example from logic port 125B, downstream to a slave device identified by the transaction request, e.g., to the target device 120 (which is a slave device). Responses from the target device 120 to DMID prepended transaction requests may be sent upstream, in one aspect prepended with the same DMID, to the X2 slave port 112, for routing to the X2 first master port 108A, and then, for example over the logic coupling 127, to the DMID assignment and tracking block 124. The DMID assignment and tracking block 124 may, in response, retrieve the routing ID associated with that DMID, prepend it to the response and send the resulting routing ID prepended transaction response upstream for delivery to the master device (e.g., the first master device 114A or the second master device 114B) that sent the transaction request.

In the example environment shown by FIG. 1, a third master device 126 interfaces with the X2 second master port 108B. The third master device 126 is assumed, as an arbitrary example, to be a proxy for three master devices (not shown), and therefore assumed to send transaction requests with a third master device MID, having any from among three values, arbitrarily selected as "0," "1" and "2." The "A2={0}" on the coupling 128 represents an example "A2" transaction request with a third master device MID value of "0".

Figure 2:
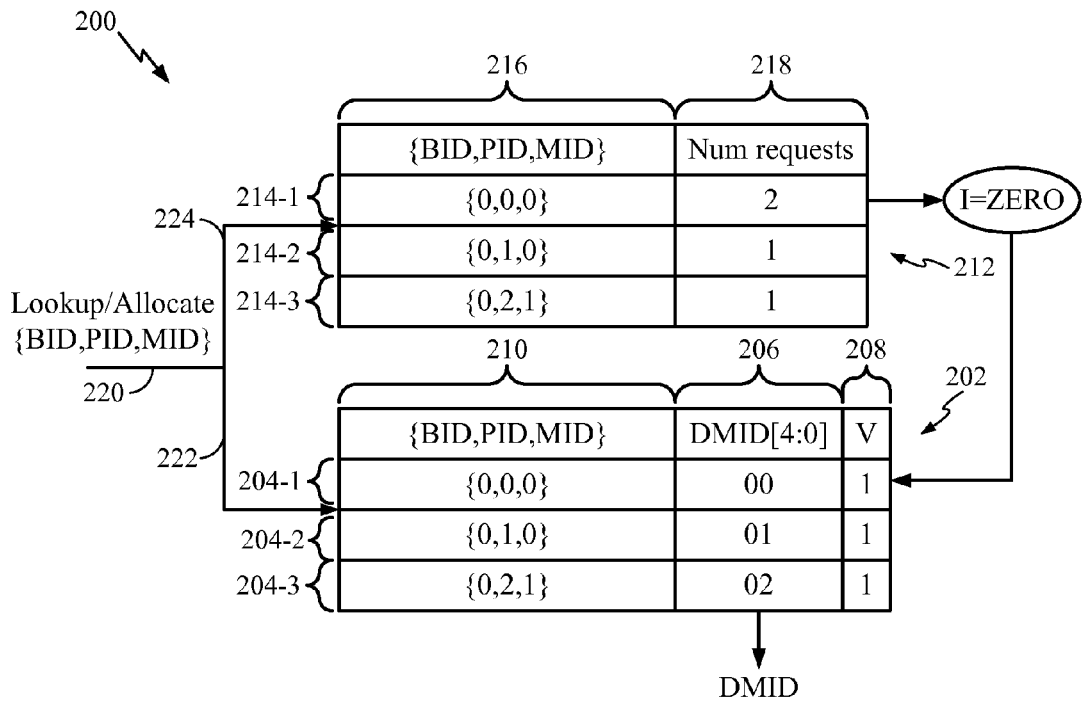
FIG. 2 is a functional logic diagram of one example dynamic temporary unique identifier assignment and tracking block, and allocation and tracking according to one exemplary embodiment.

FIG. 2 is a functional logic diagram of one example DMID assignment and tracking system 200 that may implement the FIG. 1 DMID assignment and tracking block 124. It will be understood that the FIG. 2 blocks and their arrangement, including the tables of records, and record fields referenced in the description below, are an example graphic representation of relationships between various data, and are not intended as any limitation on the scope of any of the exemplary embodiments or on any aspects thereof. Further, it will be understood that the DMID assignment and tracking block 124, as well as the DMID assignment and tracking system 200, are a combination of functional and/or logical aspects as described herein, and are not limited to any specific hardware or hardware architecture, and may be implemented by distributed processing and storage resources.

Referring to FIG. 2, the example DMID assignment and tracking system 200 may include a DMID allocation status table 202 having N DMID allocation status records (generically referenced as "204") of which three examples, labeled 204-1, 204-2, 204-3, are shown. Each of the records 204 may store a DMID, for example in a DMID field 206, and an allocation status flag, for example in the allocation status field 208 and, if the DMID in the DMID field 206 is allocated to a routing ID, the routing ID, for example in the routing ID field 210. The depicted example state of the DMID allocation status table 202, represented by the example values in its above-described fields, is that three DMIDs are allocated, with DMID "00" allocated to the {BID, PID, MID} of {0,0, 0}, DMID "01" allocated to the {BID, PID, MID} of {0,1,0}, and DMID "02" allocated to the {BID, PID, MID} of {0,2,1}. It will be understood that {BID, PID, MID} is only one example for a routing ID, and that other formats for identifying the ports and other paths through which a transaction request passed may be used in practicing according to the exemplary embodiments.

The example DMID assignment and tracking system 200 may include a DMID prepended not-responded-to request (NRT) count table 212 formed of, for example, NRT count records 214-1, 214-2 and 214-3 (collectively referenced as "214"). Each {BID,PID,MID} having a currently allocated DMID may have one of the NRT count records 214, with {BID,PID,MID} in the routing ID field 216, and the NRT count in field 218. The NRT count 218 value indicates, as described in greater detail below, the number of routing ID prepended transaction requests having the routing ID to which DMID is allocated that have been sent downstream with the DMID, but for which no response has been received.

Referring still to FIG. 2, flow 220 represents receipt of a routing ID prepended transaction request (e.g., the FIG. 1 "A0={0,0,0}" at the X1 slave port 110) from an upstream initiator (e.g., the FIG. 1 first master device 114A or second master device 114B). Flow 222 represents a lookup of the DMID allocation status table 202 to determine whether a DMID is already allocated to the received prepended {BID, PID, MID}, as well as allocation of a new DMID when the lookup 222 finds no currently allocated DMID for that received {BID, PID, MID}. Flow 224 represents incrementing the NRT count 218 of the {BID, PID, MID} count record 214 when a DMID prepended transaction request having the DMID assigned to {BID, PID, MID} in the field 216, is sent downstream.

One example sequence of receiving routing ID prepended transaction requests (e.g., on the FIG. 1 coupling 122) from an upstream initiator, or master device (e.g., the FIG. 1 second master device 114B), and associated processes according to one or more exemplary embodiments, will now be described. The example sequence will assume the first master device 114A sends an example transaction request using the first master device identifier of 0, i.e., {MID}={0} to the X1 first master port 106A. The example sequence will assume the destination of the example transaction request to be the slave device 120 coupled to the slave port 112 of the X2 interconnect 104. To illustrate concepts without unnecessary complexity, the sequence will be described as if received immediately after the FIG. 2 DMID allocation status table 202 is initialized, e.g., after a power reset, making all N DMIDs available. Referring to the DMID assignment and tracking system 200, after such a power reset the allocation status field 208 of all of the DMID allocation status records 204 may be at "0."

Upon receiving the example transaction request from the first master device 114A, prepended with {MID}={0}, the X1 first master port 106A prepends its {PID}={0}. The X1 interconnect 102 routs the now {PID, MID}={0,0} prepended transaction request to the X1 slave port 110, and in the process prepends the X1 interconnect {BID}={0}, to form what will be termed a first routing ID prepended transaction request having, as its routing ID, a prepended {BID, PID, MID}={0,0,0}. The first routing ID prepended transaction request, is transmitted over the coupling 122 to the logic port 125A of the DMID assignment and tracking block 124.

One example assignment of a DMID to the above-described example first routing ID prepended transaction request will now be described. The example assignment will be described assuming the DMID assignment and tracking block 124 being implemented by the FIG. 2 example DMID assignment and tracking system 200. This example will also assume the assignment of the DMID to be in ascending order, in terms of the DMID numbering). It will be understood that the ascending order is only an example, and is not intended as any limitation of any embodiment or of any aspect of any embodiment. Also, as previously described, this example is assumed to be a first assignment subsequent to a reset or clearing of the FIG. 2 DMID allocation status table 202, making all N DMIDs available. Under these assumptions, the FIG. 2 example DMID assignment and tracking system 200, upon receiving the first routing ID prepended transaction request, having a routing ID of {BID, PID, MID}={0,0,0}, will identify that no DMID is currently assigned to this routing ID. The DMID of "00," being the first DMID in the example ascending order, may therefore be allocated to this routing ID of {BID, PID, MID}={0,0,0}, and prepended to the routing ID prepended transaction request, for example in place of the {BID, PID, MID}={0,0,0}, to form a DMID prepended transaction request. In one aspect, the routing ID of {BID, PID, MID}={0,0,0} may be stripped in association with prepending the DMID. In another aspect, the routing ID (e.g., {BID, PID, MID}={0,0,0}) is not stripped by the prepending of the assigned DMID. The DMID prepended transaction request according to this aspect can include both the prepended DMID and the routing ID.

Referring still to FIG. 1, and continuing with description of the above-described prepending of the DMID of "00" in place of (or onto) the {BID, PID, MID}={0,0,0}, DMID prepended transaction request, with "00" being the prepended DMID, may be sent downstream to the slave device, e.g., the slave device 120, identified by the example transaction request that, as previously described, was originally sent by the first master device 114A to the first master port 106A of the X1 interconnect. As previously described, this example assumes that the destination of the example transaction request is the slave device 120, which is coupled by the coupling 130 to the slave output port 112 of the X2 interconnect 104. The example DMID prepended transaction request (with DMID of "00") after the described prepending of this DMID at the DMID assignment and tracking block 124 may then be sent, in this example over the coupling 127, to the X2 first master port 108A. The X2 interconnect 104 can, in one aspect, view the prepended DMID of "00" of the example DMID prepended transaction request that it receives at its first master port 108A as a master ID. In other words, as will be appreciated, the fact the master ID is the DMID assigned by the DMID assignment and tracking block 124, instead of a conventional master device ID, can be transparent to the X2 interconnect 104.

Continuing to refer to FIG. 1, and continuing with description of the example DMID prepended transaction, as it is received by the first master port 108A of the X2 interconnect 104, as previously described this example assumes the slave device 120 ID is in a destination field (not specifically shown) of the DMID prepended transaction request. The X2 interconnect 104 can therefore communicate this DMID prepended transaction request to the X2 interconnect slave port 112, which in turn communicates it to the slave device 120. It will be understood that the X2 first master port 108A and the X2 interconnect 104 will, in one aspect, prepend their respective {PID}={0} and {BID}={1} to the DMID prepended transaction request in the course of this described routing to the X2 interconnect slave port 112. Therefore, in this example, prepended to the transaction request that is received by the slave device 120 will be the DMID of "00", prepended with {PID}=0, and also prepended with {BID}=1. Actions by the slave device 120 in response to receiving the example DMID prepended transaction request, and example updating of the DMID assignment records in the FIG. 1 DMID assignment and tracking block 124 to reflect receipt of such responses will be described in greater detail at later sections.

An example updating, according to various aspects, of the DMID allocation records in the FIG. 1 DMID assignment and tracking block 124 to reflect the above-described allocation of the DMID of {00} to the routing ID of {BID, PID, MID}={0, 0,0}, and to reflect allocation of other DMIDs to other routing IDs, will now described. This description will reference, for purposes of convenience, the FIG. 2 DMID assignment and tracking system 200 implementation of the FIG. 1 DMID assignment and tracking block 124. It will be understood that reference to the FIG. 2 DMID assignment and tracking system 200 is not intended as any limitation of any embodiment, or of any aspect of any embodiment. Persons of ordinary skill in the art can readily, based on this disclosure, identify alternative logic for maintaining and updating records of DMID allocation in accordance with practices according to the exemplary embodiments, and will be able to readily adapt the disclosed concepts to such alternative logic.

Referring to FIG. 2, associated with the allocation of the DMID of "00" to the routing ID of {BID, PID, MID}={0,0, 0}, and associated with above-described communication of the resulting DMID prepended request, the DMID allocation status table 202 and the NRT count table 212 may be updated. For example, to update the DMID allocation status table 202 the allocation status field 208 of the DMID allocation record status 204-1, which is the DMID allocation status record 204 having the DMID of "00," may be set to "1" and {BID, PID, MID}={0,0,0} may be placed in the routing ID field 210. In addition, to update the NRT count table 212 the routing ID of {BID, PID, MID}={0,0,0} may be placed in the routing ID field 216 of the NRT count record 214-1 and the NRT count 218 set, or incremented up to "1." The NRT count 218 of "1" indicates there is now one DMID prepended request corresponding to the routing ID of {BID, PID, MID}={0,0,0} that has been sent downstream and for which no response has been received.

To show an example assignment of the next available DMID, assuming still an ascending order of DMID allocation, and assuming no response has been received for the above-described DMID prepended transaction request having a DMID of "00," it will be further assumed that another, or next routing ID prepended transaction request is received at the FIG. 2 DMID assignment and tracking system 200. This example next routing ID prepended transaction request will be assumed to be originally sent by the second master device 114B, using {MID}={0}. Since the second master device 114B is coupled to the second master port 106B of the X1 interconnect 102, having a {PID}={1}, and the X1 interconnect 102 has a {BID}={0}, the routing ID of this example next routing ID prepended transaction request can be BID, PID, MID}={0,1,0}. Since DMID of "00" was the last DMID allocated, and the order of allocation (in this example) is ascending, the DMID of "01" will be the first available DMID. Therefore, the DMID of "01" will be allocated to {BID, PID, MID}={0,1,0}. The above-described prepending of the allocated DMID is repeated, with the prepended DMID being "01," and the resulting DMID prepended transaction request sent downstream. Assuming the routing ID prepended transaction request having a {BID, PID, MID}={0,1,0} is the FIG. 1 "A1={0,1,0}," the resulting DMID prepended transaction request will be "A1" prepended with the DMID of "01," which is shown as "A1={01}" on the FIG. 1 depicted coupling 130 to the slave device 120.

Referring to FIG. 2, an updating of the DMID allocation status field to reflect the above-described allocation of DIMD of "01" to {BID, PID, MID}={0,1,} will be described. The updating of the DMID allocation status table 202 may be performed by setting the allocation status field 208 of the DMID allocation status record 204-2, which is the DMID allocation status record 204 having the DMID of "01," may be set to "1" and {BID, PID, MID}={0,1,0} may be placed in field 210. The NRT count table 212 may be updated by placing the routing ID of {BID, PID, MID}={0,1,0} in the routing ID field 216 of the NRT count record 214-2 and incrementing or setting the NRT count 218 to "1." This NRT count 218 of "1" in the NRT count record 214-2 indicates there is now one DMID-prepended request corresponding to the routing ID of {BID, PID, MID}={0,1,0} that has been sent downstream and for which no response has been received.

Further continuing with the above-described example of receiving routing ID prepended transaction requests, a next routing ID prepended transaction request may have as its routing ID {BID, PID, MID}={0,2,1}. There is no interconnect shown on FIG. 1 having a master port with a PID of "2," so reference to FIG. 1 will be omitted. Referring to FIG. 2 and continuing with the ascending order of DMID allocation, when the routing ID prepended transaction request having a routing ID {BID, PID, MID}={0,2,1} arrives, the DMID of "02" may be allocated, a prepending of the allocated DMID of "02" performed, and the resulting DMID prepended transaction request sent downstream. The DMID allocation status table 202 may be updated by setting the allocation status field 208 of the DMID allocation status record 204-3, which is the DMID allocation status record 204 having the DMID of "02," may be set to "1" and {BID, PID, MID}={0,2,1} may be placed in its routing ID field 210. The NRT count table 212 may be updated by placing the routing ID of {BID, PID, MID}={0,2,1} in routing ID field 216 of the NRT count record 214-3 and incrementing or setting the NRT count 218 to "1." This NRT count 218 of "1" in the NRT count record 214-3 indicates there is now one DMID prepended request corresponding to the routing ID of {BID, PID, MID}={0,2,1} that has been sent downstream and for which no response has been received.

It will be appreciated by persons of ordinary skill in the art that in methods and systems according to the exemplary embodiments the routing ID, for example {BID, PID, MID}, of a routing ID message received, for example, logic port 125A of the DMID assignment and tracking block 124 from upstream devices such as the first and second master devices 114A and 114B may have a first number of bits, equal to the sum of the bits in each of the BID, PID, and MID. It will be further appreciated by such persons that, among other features and benefits provided by the exemplary embodiments, the number of bits that the DMID assignment and tracking block 124, or its example DMID assignment and tracking system 200, uses for the DMIDs that dynamically allocates to the first and second master devices 114A and 114B and substitutes for the routing ID, for example {BID, PID, MID}, may have a second number of bits significantly less than the first number of bits.

The previous description of example operations on the FIG. 2 DMID assignment and tracking system 200 illustrates aspects of the exemplary embodiments relating to its receiving of routing ID prepended transaction requests sent by, for example, the FIG. 1 first master device 114A or second master device 114B. Example aspects relating to the FIG. 2 DMID assignment and tracking system 200 receiving responses from the target devices, to the DMID-prepended transaction requests described above as generated and sent downstream, will be now described with reference to the FIG. 3 state transition.

Figure 3:
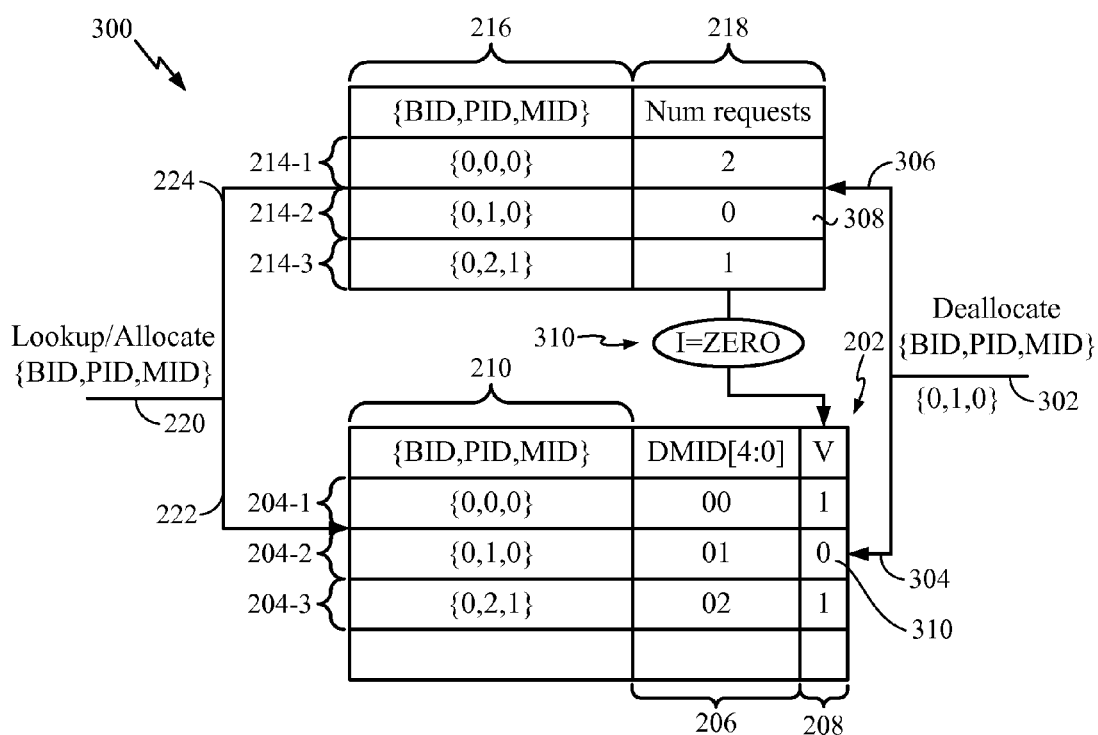
FIG. 3 is a functional logic diagram of one example dynamic temporary unique identifier assignment and tracking block, and de-allocation and tracking according to one exemplary embodiment.

The FIG. 3 state transition 300 shows an example de-allocation, resulting from receiving (e.g., from the FIG. 1 slave device 120) a response to the previously described DMID-prepended transaction request associated with {BID, PID, MID}={0,1,0}—in the absence of receiving in the interim another routing ID prepended transaction request having a routing ID of {BID, PID, MID}={0,1,0}.

Referring to FIG. 3, the flow 302 represents the above-described receipt of the above-DMID-prepended response from a target device, in response to the DMID-prepended transaction request associated with {BID, PID, MID}={0,1,0}. Flow 304 represents a search, or other actions to check the contents of the DMID allocation status table 202 to find the record for the DMID prepended to the DMID-prepended response received at flow 302. In this example, the checking at 304 will find the DMID of "01" at the DMID allocation status record 204-2 and this has {BID, PID, MID}={0,1,0}. The DMID of "01" may then be stripped (not shown in FIG. 2) from the subject DMID-prepended response, and the routing ID of {BID, PID, MID}={0,1,0} prepended instead. The resulting routing ID prepended transaction response may then be sent upstream, which in the FIG. 1 example scalable NTT system 100 would be to the X1 slave port 110. The routing ID of {BID, PID, MID}={0,1,0} provides for the X1 interconnect 102 to route the subject response to the second master device 114B, as a response to the transaction request "A1."

Referring still to FIG. 3, a result of the above-described receipt of a DMID-prepended transaction response is that there is one less DMID-prepended transaction request corresponding to the routing ID of {BID, PID, MID}={0,1,0} for which a response has not been received. The flow 306 of updating the NRT count table 212 may be a decrementing of the NRT count 218 of the DMID prepended request status record 214-2. However, in this example the updated NRT count 218 value, labeled 308 in FIG. 3, is "0." Therefore, in this example, there are now zero DMID prepended transaction requests associated with {BID, PID, MID}={0,1,0} for which a response has not been received. The DMID of "01" is therefore no longer in use by {BID, PID, MID}={0,1,0}. The DMID of "01" may therefore be de-allocated. The DMID of "01" will therefore be available for re-allocation, for example to the next routing ID prepended transaction request received having, as may be determined by a search of the DMID allocation status table 202, no allocated DMID. FIG. 3 depicts this example de-allocation of the DMID of "01" as flow 308, which sets the NRT count 218 of NRT count record 214-2 and, as flow 310, setting of the allocation status field 208 of the DMID allocation record status 204-2 to a "0." Therefore, when the next routing ID prepended transaction request is received and determined to have DMID allocated to its routing ID, it may be allocated this DMID of "01."

The above-described example de-allocation of the DMID of "01" assumed no other routing ID prepended transaction request having a routing ID of {BID, PID, MID}={0,1,0} had been received prior to receiving the DMID prepended transaction response that decremented the NRT count 218 of the NRT count record 214-2 to "0." As will be understood by persons ordinary skill in the art from this disclosure, if another routing ID prepended transaction request having the routing ID of {BID, PID, MID}={0,1,0} had been received, prior to receiving the DMID-prepended transaction response described above as causing de-allocation of the DMID of "01," the NRT count 218 in the NRT count record 214-2 would have been incremented to a value of "2." In such an example, the NRT count 218 in the NRT count record 214-2 would have been decremented to a value of "1." The de-allocation shown by the FIG. 3 state 300 would therefore not be performed.

As previously described, the FIG. 1 and FIG. 2 blocks and their arrangement, including the tables of records, and record fields referenced in the description, are an example graphic representation of relationships between various data, and not intended as any limitation on the scope of any of the exemplary embodiments or on any aspects thereof. As one illustration, a DMID assignment and tracking system 200 may be implemented by a processor (not explicitly shown) or a plurality of processors, configured to receive a message, such as a routing ID prepended transaction request as described, from an upstream network, for example from the X1 slave port 110 of the X1 interconnect 102, and further configured, to assign a DMID or other temporary identifier(s) to the routing ID, to store a record, for example the DMID allocation status record 202, associating the routing ID with the DMID, and configured to communicate the DMID prepended transaction request to a downstream network, for example the X2 interconnect 104, to receive from the X2 interconnect 104 a response message having the DMID, for example the previously described DMID prepended transaction response. Such a processor or processors may be further configured to identify the routing ID associated with the prepended DMID based on the record, e.g., the DMID allocation status record 202, and to communicate the response message to the X1 interconnect 102 or other upstream network with the identified routing ID. This is only one illustration, not intended to limit the scope of the exemplary embodiments, or any aspect thereof.

Figure 4:
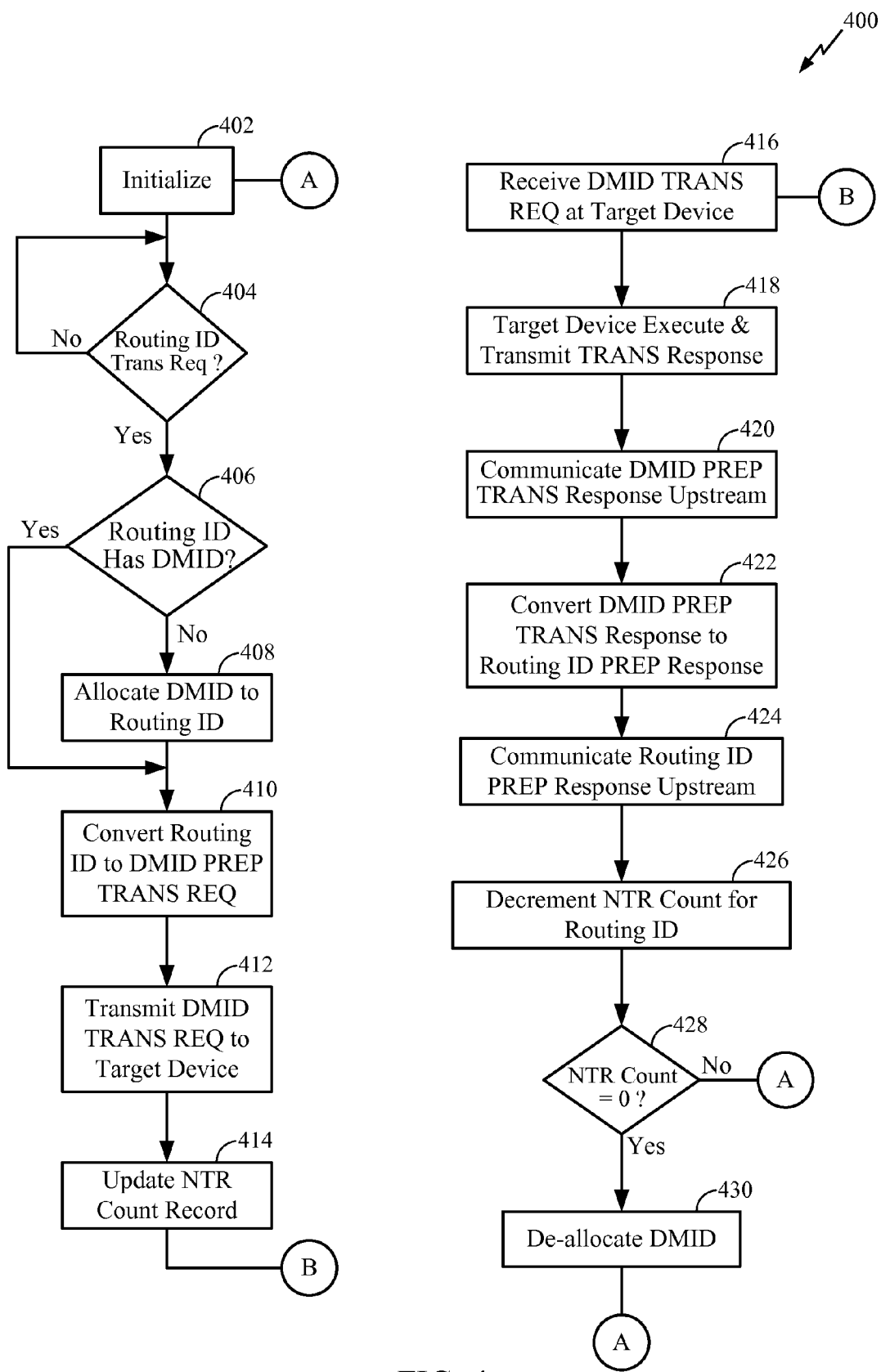
FIG. 4 is a logic flow diagram of one example temporary unique identifier assignment and tracking process according to one exemplary embodiment.

FIG. 4 is a logic flow diagram of one example temporary unique ID assignment and tracking process 400 (hereinafter referenced as "the DMID assignment and tracking process 400) for a scalable network transaction interconnect system according to one exemplary embodiment. To show examples of concepts being applied there will be reference to the FIG. 1 example scalable NTT system 100, and to the FIG. 2 example DMID assignment and tracking system 200. It will be understood that these references are not intended to limit the scope of the DMID assignment and tracking process 400, or the scope of any exemplary embodiment within the FIG. 4 subject matter, to any particular structure. Further, it will be understood that the FIG. 4 distribution and grouping of functions into the depicted blocks is not limiting of the grouping, or temporal order of functions that systems and methods according to the exemplary documents may perform.

Referring to FIG. 4, in an example according to the DMID assignment and tracking process 400 an initialization 402 may be performed. The initialization 402 may include, for example, clearing or resetting DMID allocation records to indicate all of the DMIDs are available. As one example of one initialization 402, the FIG. 2 DMID allocation status table 202 and the NRT count table 212 may be cleared. Referring to FIG. 4, after the initialization 402 all of the DMIDs are available. An example according to the process 400 may go to 404 and may wait (with respect to this portion of the DMID assignment and tracking process 400) until a route ID prepended transaction request is received, e.g., on the FIG. 1 coupling logic 122. When a routing ID prepended transaction request is received, an example according to the DMID assignment and tracking process 400 may go from 404 to a DMID lookup 406 to determine if a DMID has already been allocated to the received routing ID. One example of a DMID lookup 406 may be shown at FIG. 2, by a lookup and such as shown by the flow 222, or other checking of the DMID allocation status table 202.

With continuing reference to FIG. 4, if the answer at the lookup 406 is "NO," which will occur in this example because this is the first transaction request received subsequent to the initialization 402, an example according to the DMID assignment and tracking process 400 may go to a DMID allocation 408 to allocate one of the available DMIDs to the routing ID. One DMID allocation 408 may be shown at FIG. 2, for example by changing the DMID allocation record 204 of the DMID being allocated to have an allocation status flag 208 of "1" instead of "0," and by placing the routing ID to which the DMID is being allocated in the routing ID field 210. Referring to FIG. 4, after the allocation or assignment at 408 an example according to the process 400 may go to 410 to convert the routing ID prepended transaction request received at 404 to a DMID prepended transaction request, and then to 412 to communicate the DMID prepended transaction request downstream to the target device. Before continuing with description of an example going to 410, it will be understood that examples according to the process 400 that continue for a duration after the initialization at 402 will generate a "YES" at 406, indicating that a DMID has already been assigned to the routing ID received at 404. In such instances an example according to the DMID assignment and tracking process 400 may go directly to 410 to convert the routing ID prepended transaction request to a DMID prepended transaction request.

Referring to FIG. 4, in one example according to the DMID assignment and tracking process 400 a converting at 410 may be performed, in one aspect, by stripping the routing ID from the routing ID prepended transaction request received at 404 and prepending in its place the DMID identified at 406 or the DMID allocated at 408 to form a DMID prepended transaction request. In one aspect, a converting at 410 can optionally leave the routing ID on the message, but prepended with the DMID, for example for an optional communicating of response messages by the slave device 120 with the routing ID, and subsequent routing by the X2 interconnect 104 back to the initiator port. The DMID prepended transaction request is then at 412 communicated downstream to the target device specified by the transaction request. The communication at 412 may be through a downstream interconnect, such as the FIG. 1 example X2 interconnect 104. It will be understood that communication of the DMID prepended transaction request through a downstream interconnect may include the downstream interconnect tracking the communication using the prepended DMID to identify the upstream source. It will also be understood that the downstream interconnect may track this communication in order route an upstream response message prepended with the same DMID back to the initiator port of the downstream interconnect at which the DMID prepended transaction request was originally received. Referring to FIGS. 1 and 4 together, one communication 412 may be shown by, for example, the X2 interconnect 104 receiving at its X2 first master port 108A the transaction request "A0" prepended with the DMID "00" and, based on the ID of the slave device 120 specified by "A0," communicating the DMID "00" prepended "A0" to the X2 slave port 112, as shown by the "A0=00" on the coupling 130. It will be understood that the X2 interconnect 104 may track this communication in order to associate a response message received at the X2 slave port 112 and prepended with the DMID of "00" to the X2 first master port 108A at which "A0" prepended with the DMID "00" was received.

Referring to FIG. 4, in one example according to the DMID assignment and tracking process 400, after a communication at 412 of the DMID prepended transaction request generated at 410, an NRT count record for the routing ID associated with the DMID may be updated (i.e., incremented) at 414. One example NRT count record updating 414 may be shown at FIG. 2, for example by placing the routing ID associated with the DMID into an NRT count record 214 of the NRT count table 212 and setting the NRT count 218 to "1" or, if the lookup at 406 determined that a DMID was already allocated to the received routing ID, by incrementing the NRT count 218 of the NRT count record 214 for that routing ID.

Referring still to FIG. 4, in one example according to the DMID assignment and tracking process 400 the communication at 412 ends at 416 when the DMID prepended transaction request communicated is received at the target device to which it is directed. One example of a reception at 416 may be shown at FIG. 1, for example at the coupling 130 of the slave device 120 to the X2 slave port 112 the transaction request "A0" prepended with the DMID of "00," and the transaction request "A1" prepended with the DMID of "01."

Continuing to refer to FIG. 4, in one example according to the DMID assignment and tracking process 400, after a reception at 416 of the DMID prepended transaction request at the target device, the target device may at 418 execute and transmit a response upstream, with the content of the response being in accordance with the transaction request. For brevity in subsequent description, these responses will be referred to generically as "DMID prepended transaction responses." One example of one execute and transmit at 418 may be shown at FIG. 1, for example by the transaction request "A0" prepended with the DMID of "00" being a data read of a specified memory block, and the slave device 120 responding with the data from that memory block prepended with the DMID "00."

Referring to FIG. 4, in one example according to the DMID assignment and tracking process 400, after a target device executes the transaction request and transmits a DMID prepended transaction response at 418, the DMID prepended transaction response may at 420 be communicated upstream in accordance with the prepended DMID. Referring to FIG. 1, one example communication 420 may be shown by the X2 slave port 112 receiving a response to "A0" from the slave device 120, prepended with the DMID "00," and the X2 interconnect 104 routing that response, based on the DMID of "00", to the X2 first master port 108A, and then to the DMID assignment and tracking block 124. As previously described, the FIG. 2 example DMID assignment and tracking system 200 may, instead of stripping the routing ID when forming the DMID prepended transaction request, prepend the DMID to the routing ID. The DMID prepended transaction request would then include both the prepended DMID and the routing ID. In one related aspect, the slave device 120 may, as a selective alternate to 418, send the response with the routing ID, instead of the DMID. Further to this one aspect, the response may, instead of the communication at 420 according to the DMID, be communicated upstream based on the routing ID.

Referring to FIG. 4, after the above-described upstream communication at 420 of the DMID prepended transaction response an example according to the DMID assignment and tracking process 400 may go to 422 to convert DMID prepended transaction response to a routing ID prepended transaction response, prepended with the routing ID to which the DMID is assigned. Referring to FIGS. 3 and 4 together, one converting 422 may be shown by the flow 304, indicating a search or checking of the DMID allocation status table 202 to find the record for the DMID prepended to the DMID-prepended response received at 302. FIG. 3 shows, as one example, that the checking at 304 may find the DMID of "01" at the DMID allocation status record 204-2 and this has {BID, PID, MID}={0,1,0}. The DMID of "01" may then be stripped, the routing ID of {BID, PID, MID}={0,1,0} prepended instead.

Referring still to FIG. 4, an example according to the process may, after converting the DMID prepended transaction response to a routing ID prepended transaction response at 422, go to 424 and communicate the routing ID prepended transaction response to the initiator of the associated transaction request. Referring to the FIG. 1 example scalable NTT system 100, one communication at 424 may be shown by, for example, the X1 slave port 110 routing, in accordance with the routing ID of {BID, PID, MID}={0,1,0}, the transaction response to the X1 second master port 106B, for communication to the second master device 114B. The second master device 114B may communicate this (based on the MID value of "0") to one of the three master devices (not shown in FIG. 1) for which it serves as proxy.

Referring to FIG. 4, in one example according to the DMID assignment and tracking process 400, after (or concurrent with) identifying at 422 the routing ID of the received DMID prepended transaction response, the NRT count corresponding to the identified routing ID may, at 426, be decremented by one, indicating one less DMID prepended transaction request associated with that routing ID that requires a receipt of a response. One example of a decrementing 426 is shown at FIG. 3, for example by decrementing, in response to receiving a DMID prepended transaction response for the routing ID of {0,1,0}" stored in the NRT count record 214-2, its NRT count 218. Referring to FIG. 4, an example according to the DMID assignment and tracking process 400 may then go the conditional decision block 428 and test if the NRT count of the routing ID is "0." If the answer at 428 is "NO" the process may go to the wait block 404. If the answer at 428 is "YES," the routing ID identified at 420 no longer has active use of the DMID that was assigned to it. An example according to the DMID assignment and tracking process 400 may then go to 430, and de-allocate or release the DMID for allocation or assignment to the next routing ID detected at the lookup 406 as not having an assigned DMID. One example of such a de-allocation may be shown at FIG. 3, where the depicted NRT count 218 for the NRT count record 214-2 of {BID, PID, MID} is "0" after being decremented in response to receiving the DMID-prepended transaction requests associated with {BID,PID,MID}={0,1,0} and the allocation status field 208 of the DMID allocation record status 204-2 is set to "0."

Figure 5:
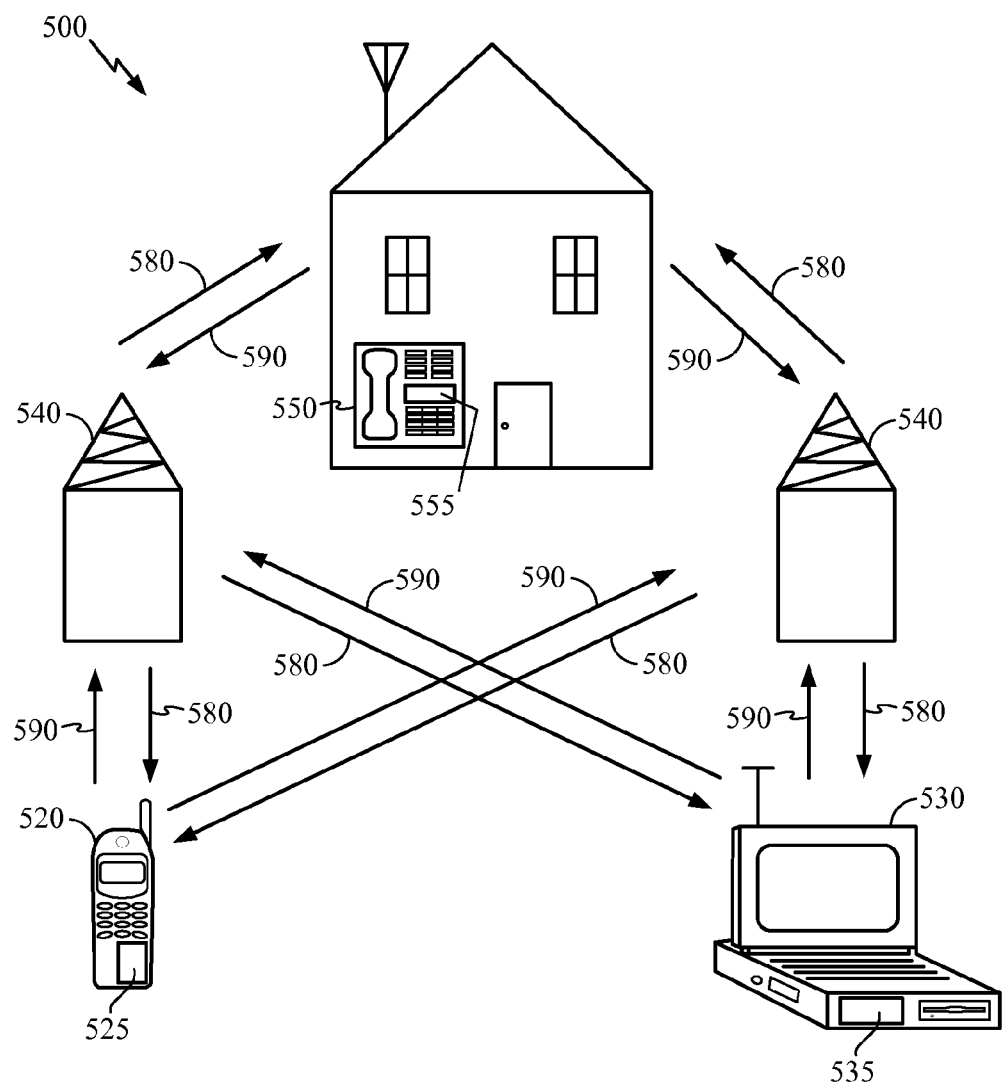
FIG. 5 is a functional block diagram of a system having example devices according to one or more exemplary embodiments.

FIG. 5 illustrates an exemplary wireless communication system 500 in which one or more embodiments of the disclosure may be advantageously employed. For purposes of illustration, FIG. 5 shows three remote units 520, 530, and 550 and two base stations 540. It will be recognized that conventional wireless communication systems may have many more remote units and base stations. The remote units 520, 530, and 550 include semiconductor devices 525, 535 and 555 (including any network communication apparatus as disclosed herein), which are among embodiments of the disclosure as discussed further below. FIG. 5 shows forward link signals 580 from the base stations 540 and the remote units 520, 530, and 550 and reverse link signals 590 from the remote units 520, 530, and 550 to the base stations 540.

In FIG. 5, the remote unit 520 is shown as a mobile telephone, the remote unit 530 is shown as a portable computer, and the remote unit 550 is shown as a fixed location remote unit in a wireless local loop system. However, it will be understood that these are only example. The remote unit 520 and the remote unit 530 may each be, or may be capable of performing as any one or more of, for example, a mobile phone, a hand-held personal communication systems (PCS) unit, a portable data unit or device such as a personal data assistant (PDA), navigation device (such as a GPS enabled devices), a set top box, a music player, a video player, portable game player, or another entertainment unit, a fixed location data unit such as meter reading equipment, or any other device that stores or retrieves data or computer instructions, or any combination thereof. Although FIG. 5 illustrates remote units according to the teachings of the disclosure, the disclosure is not limited to these exemplary illustrated units. Embodiments of the disclosure may be suitably employed in any device which includes active integrated circuitry including memory and on-chip circuitry for test and characterization.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an embodiment of the invention can include a computer readable media embodying a method for communication through networks according to one or more of the exemplary embodiments. Accordingly, the invention is not limited to illustrated examples and any means for performing the functionality described herein are included in embodiments of the invention.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method, comprising:
   receiving a message having a routing identifier;
   assigning the message, based on the routing identifier, a temporary identifier;
   storing a record associating the routing identifier with the temporary identifier;
   communicating the message with the temporary identifier;
   updating the record associating the routing identifier with the temporary identifier to reflect communicating the message with the temporary identifier;
   receiving a response message having the temporary identifier;
   updating the record associating the routing identifier with the temporary identifier in response to receiving the response message having the temporary identifier; and
   communicating the response message according to the routing identifier associated with the temporary identifier.

2. The method of claim 1, wherein receiving the message having the routing identifier receives the message from an upstream initiator,
   wherein storing a record includes storing the routing identifier associated with the temporary identifier to be retrievable based on the temporary identifier, and
   wherein communicating the response message communicates the response message upstream, toward the upstream initiator.

3. The method of claim 1, further comprising:
   receiving at a destination device the message communicated with the temporary identifier;
   generating the response message based, at least in part, on a content of the received message communicated with the temporary identifier; and
   communicating the response message upstream based on the temporary identifier.

4. The method of claim 3, wherein the destination device is a target device downstream of assigning the message the temporary identifier, and
   and
   wherein receiving the response message having the temporary identifier is upstream of the target device.

5. The method of claim 1, wherein communicating the message with the temporary identifier comprises stripping the routing identifier from the message and prepending the temporary identifier to the message.

6. The apparatus of claim 1, wherein communicating the message with the temporary identifier comprises prepending the temporary identifier to the message with the routing identifier.

7. The method of claim 6, wherein receiving the message with the temporary identifier includes receiving said message with the temporary identifier at a target device downstream of assigning the message the temporary identifier, wherein receiving the response message having the temporary identifier is upstream of the target device, and wherein the method further comprises communicating the response message from the target device, according to the routing identifier, the response message having the temporary identifier.

8. The method of claim 1, wherein the received message having the routing identifier includes a target device identifier, and wherein communicating the message with the temporary identifier includes communicating the message to a target device associated with the target device identifier.

9. The method of claim 1, wherein the method further comprises detecting whether a temporary identifier has already been assigned to the routing identifier, and wherein assigning the message, based on the routing identifier, a temporary identifier includes, if a temporary identifier has not already been assigned, identifying a non-assigned temporary identifier and assigning the non-assigned temporary identifier to the routing identifier.

10. The method of claim 9, wherein if a temporary identifier has already been assigned, communicating the message with the temporary identifier includes communicating the message with the already assigned temporary identifier.

11. The method of claim 10, further comprising updating the record associating the routing identifier with the already assigned temporary identifier to reflect communicating the message with the already assigned temporary identifier.

12. The method of claim 1, wherein the record associating the routing identifier with the temporary identifier includes a pending request count indicating, for the routing identifier, a quantity of messages communicated with the temporary identifier assigned to the routing identifier for which a corresponding message with the temporary identifier has not been received.

13. The method of claim 12, wherein updating the record associating the routing identifier with the temporary identifier to reflect communicating the response message with the temporary identifier comprises increasing the pending request count, and wherein updating the record associating the routing identifier with the temporary identifier to reflect the receiving the response message having the temporary identifier includes decreasing the pending request count.

14. The method of claim 1, wherein the record associating the routing identifier with the temporary identifier includes a number of pending requests counter, wherein updating the record associating the routing identifier with the temporary identifier to reflect the communicating the message with the temporary identifier includes incrementing the number of pending requests counter, and wherein updating the record associating the routing identifier with the temporary identifier to reflect receiving the message with the temporary identifier includes decrementing the number of pending requests counter.

15. The method of claim 14, wherein assigning the message the temporary identifier includes allocating the temporary identifier to the routing identifier, wherein the method further comprises, if decrementing the number of pending requests counter results in a counter value indicating no pending requests, de-allocating the temporary identifier for a subsequent assignment.

16. An apparatus, comprising:
an interface configured to receive messages from a network; and
a processor coupled to the interface, wherein the processor is configured to:
receive a message having a routing identifier;
assign the message, based on the routing identifier, a temporary identifier;
store a record associating the routing identifier with the temporary identifier;
communicate the message with the temporary identifier;
update the record associating the routing identifier with the temporary identifier to reflect communicating the message with the temporary identifier;
receive a response message having the temporary identifier;
update the record associating the routing identifier with the temporary identifier to reflect receiving the response message having the temporary identifier; and
communicate the response message according to the routing identifier associated with the temporary identifier.

17. The apparatus of claim 16, wherein the processor is configured to receive the message having the routing identifier from an upstream initiator,
wherein the processor is configured to store the record to include the routing identifier associated with the temporary identifier and to retrieve the record based on the temporary identifier, and
wherein the processor is configured to communicate the response message according to the routing identifier upstream toward the upstream initiator.

18. The apparatus of claim 16, wherein the processor is further configured to communicate the message with the temporary identifier toward a destination device downstream of assigning the temporary identifier, wherein the processor is further configured to:
receive at the destination device the message communicated with the temporary identifier;
generate the response message based, at least in part, on a content of the received message communicated with the temporary identifier; and
communicate the response message upstream based on the temporary identifier.

19. The apparatus of claim 16, wherein configured to communicate the message with the temporary identifier includes configured to strip the routing identifier from the message and prepend the temporary identifier to the message.

20. The apparatus of claim 16, wherein configured to communicate the message with the temporary identifier includes configured to prepend the temporary identifier to the message with the routing identifier.

21. The apparatus of claim 20, wherein the processor is configured to receive the message having the routing identifier from an upstream initiator, and
wherein the processor is further configured to communicate the response message received from the target device, upstream toward the upstream initiator, according to the routing identifier to which the temporary identifier is prepended.

22. The apparatus of claim 16, wherein configured to receive a message having the routing identifier includes configured to receive a message target device identifier, and wherein configured to communicate the message with the temporary identifier includes configured to communicate the message to a target device associated with the target device identifier.

23. The apparatus of claim 16, wherein the processor is further configured to detect whether a temporary identifier has already been assigned to the routing identifier and, if a temporary identifier has not already been assigned, to identify a non-assigned temporary identifier and to assign the non-assigned temporary identifier to the routing identifier.

24. The apparatus of claim 16, wherein the processor is further configured to determine if a temporary identifier has already been assigned to the routing identifier if the received message and, if a temporary has already been assigned, to communicate the message with the already assigned temporary identifier.

25. The apparatus of claim 24, wherein the processor is further configured to update the record associating the routing identifier with the already assigned temporary identifier to reflect communicating the message with the already assigned temporary identifier.

26. The apparatus of claim 16, wherein configured to store a record associating the routing identifier with the temporary identifier includes configured to store in the record a pending request count indicating, for the routing identifier, a quantity of messages communicated with the temporary identifier assigned to the routing identifier for which a corresponding message with the temporary identifier has not been received.

27. The apparatus of claim 26, wherein configured to update the record associating the routing identifier with the temporary identifier to reflect communicating the response message with the temporary identifier includes configured to update the record by increasing the pending request count, and wherein configured to update the record associating the routing identifier with the temporary identifier to reflect the receiving the response message having the temporary identifier included configured to update the record by decreasing the pending request count.

28. The apparatus of claim 16, wherein the record associating the routing identifier with the temporary identifier includes a number of pending requests counter, wherein configured to update the record associating the routing identifier with the temporary identifier to reflect the communicating the message with the temporary identifier includes configured to update the record by incrementing the number of pending requests counter, and wherein configured to update the record associating the routing identifier with the temporary identifier to reflect receiving the message with the temporary identifier includes configured to update the record by decrementing the number of pending requests counter.

29. The apparatus of claim 28, wherein configured to assign the message the temporary identifier includes configured to allocate the temporary identifier to the routing identifier, wherein the processor is further configured to detect if decrementing the number of pending requests counter results in a counter value indicating no pending requests and, in response, to de-allocate the temporary identifier for a subsequent assignment.

30. The apparatus of claim 16, wherein the apparatus is integrated in at least one semiconductor die.

31. The apparatus of claim 16, further comprising a device, selected from the group consisting of a set top box, music player, video player, entertainment unit, navigation device, communications device, personal digital assistant (PDA), fixed location data unit, and a computer, into which the apparatus is integrated.

32. A computer-readable tangible medium comprising instructions, which when executed by a processor in a network operate to assign temporary identifiers to messages, the computer-readable media comprising:
  instructions for receiving, from an interface to the network, a message having a routing identifier;
  instructions for assigning the message, based on the routing identifier, a temporary identifier;
  instructions for storing a record associating the routing identifier with the temporary identifier;
  instructions for communicating the message with the temporary identifier;
  instructions for updating the record associating the routing identifier with the temporary identifier to reflect communicating the message with the temporary identifier;
  instructions for receiving a response message having the temporary identifier;
  instructions for updating the record associating the routing identifier with the temporary identifier in response to receiving the response message having the temporary identifier; and
  instructions for communicating the response message according to the routing identifier associated with the temporary identifier.

33. An apparatus for communicating messages between an upstream source and a downstream network, comprising:
  means for receiving a message from the upstream initiator having a routing identifier;
  means for assigning the message, based on the routing identifier, a temporary identifier;
  means for storing a record associating the routing identifier with the temporary identifier;
  means for communicating the message with the temporary identifier to the downstream network;
  means for updating the record associating the routing identifier with the temporary identifier to reflect communicating the message with the temporary identifier;
  means for receiving from the downstream network a response message having the temporary identifier;
  means for updating the record associating the routing identifier with the temporary identifier in response to receiving the response message having the temporary identifier; and
  means for communicating the response message to the upstream source associated with the routing identifier.

34. The method of claim 1, further comprising:
  determining if the routing identifier associated with the temporary identifier no longer has active use of the temporary identifier, based on a result of updating the record associating the routing identifier with the temporary identifier to reflect receiving the response message having the temporary identifier; and
  if the routing identifier associated with the temporary identifier is determined to no longer have active use of the temporary identifier, then releasing the temporary identifier for subsequent assignment to another routing identifier.

35. The apparatus of claim 16, wherein the processor is further configured to
  determine if the routing identifier associated with the temporary identifier no longer has active use of the temporary identifier, based on a result of updating the record associating the routing identifier with the temporary identifier to reflect receiving the response message having the temporary identifier; and
if the routing identifier associated with the temporary identifier is determined to no longer have active use of the temporary identifier, to release the temporary identifier for subsequent assignment to another routing identifier.

36. The computer-readable medium of claim 32, further comprising:
instructions for determining if the routing identifier associated with the temporary identifier no longer has active use of the temporary identifier, based on a result of updating the record associating the routing identifier with the temporary identifier to reflect receiving the response message having the temporary identifier; and
instructions for releasing the temporary identifier, if the routing identifier associated with the temporary identifier is determined to no longer have active use of the temporary identifier, for subsequent assignment to another routing identifier.

37. The apparatus of claim 33, further comprising
means for determining if the routing identifier associated with the temporary identifier no longer has active use of the temporary identifier, based on a result of updating the record associating the routing identifier with the temporary identifier to reflect receiving the response message having the temporary identifier; and
means for releasing the temporary identifier for subsequent assignment to another routing identifier if the routing identifier associated with the temporary identifier is determined to no longer have active use of the temporary identifier.

38. A method, comprising:
receiving a message having a routing identifier and a target device identifier;
assigning the message, based on the routing identifier, a temporary identifier;
storing a record associating the routing identifier with the temporary identifier; and
communicating to a target device identified by the target device identifier the message having the routing identifier and the target device identifier, and having the temporary identifier prepended to the routing identifier;
receiving a response message having the temporary identifier; and
communicating the response message according to the routing identifier associated with the temporary identifier.

39. The method of claim 38, wherein the method further comprises;
receiving at the target device the message having the routing identifier with the temporary identifier prepended to the routing identifier;
generating at the destination device the response message, wherein the response message includes the routing identifier and the temporary identifier; and
communicating the response the response message having routing identifier and the temporary identifier.

40. The method of claim 39, wherein receiving the message having the routing identifier comprises receiving the message from an upstream initiator, and wherein communicating the response message according to the routing identifier associated with the temporary identifier comprises communicating the response message upstream toward the upstream initiator, according to the routing identifier included in the response message received from the downstream destination device.

41. An apparatus, comprising:
an interface configured to receive messages from a network; and
a processor coupled to the interface, wherein the processor is configured to:
receive a message having a routing identifier and a target device identifier;
assign the message, based on the routing identifier, a temporary identifier;
store a record associating the routing identifier with the temporary identifier;
communicate to a target device identified by the target device identifier the message having the routing identifier and the target device identifier, and having the temporary identifier prepended to the routing identifier;
receive a response message having the temporary identifier;
communicate the response message according to the routing identifier associated with the temporary identifier.

42. The apparatus of claim 41, wherein the processor is configured to
receive the message having the routing identifier from upstream initiator;
receive a response message from the target device, having the temporary identifier and the routing identifier to which the temporary identifier was prepended;
communicating the response message upstream toward the upstream initiator, according to the routing identifier in the response message received from the downstream destination device.

* * * * *